United States Patent [19]
Barlow

[11] 3,774,956
[45] Nov. 27, 1973

[54] PARALLEL ATTACHABLE, TWO STORY EXPANDABLE, TRAILABLE BUILDING STRUCTURES

[76] Inventor: Richard A. Barlow, 2008 Dundee Rd., Rockville, Md. 20850

[22] Filed: Nov. 22, 1971

[21] Appl. No.: 201,082

[52] U.S. Cl. ............... 296/23 G, 296/26, 52/66
[51] Int. Cl. ............................................. B60p 3/32
[58] Field of Search ............... 296/27, 26, 23 R, 296/23 G, 137 B, 137 C, 137 F, 100; 52/64, 66, 69, 79, 169

[56] References Cited
UNITED STATES PATENTS

| | | | |
|---|---|---|---|
| 2,363,259 | 11/1944 | Penton | 296/23 R |
| 3,667,800 | 6/1972 | Cuthbert | 296/27 |
| 2,408,132 | 9/1946 | Weeks | 296/137 B |
| 3,604,166 | 9/1971 | Ciccarelli | 52/79 |
| 3,069,224 | 12/1962 | Bigelow | 52/79 |
| 3,561,175 | 2/1971 | Best et al. | 52/169 |

Primary Examiner—Philip Goodman
Assistant Examiner—John A. Carroll

[57] ABSTRACT

Series of similar mobile homes having roof and wall members hingedly joined to said structures, allowing members to assume outwardly expanded angularly oriented positions, forming second story living space. Further having angularly mounted bracing members on outer portion of sidewalls at floor levels for attachment of like structures in stabilized parallel positions, being individually removeable or addable.

4 Claims, 18 Drawing Figures

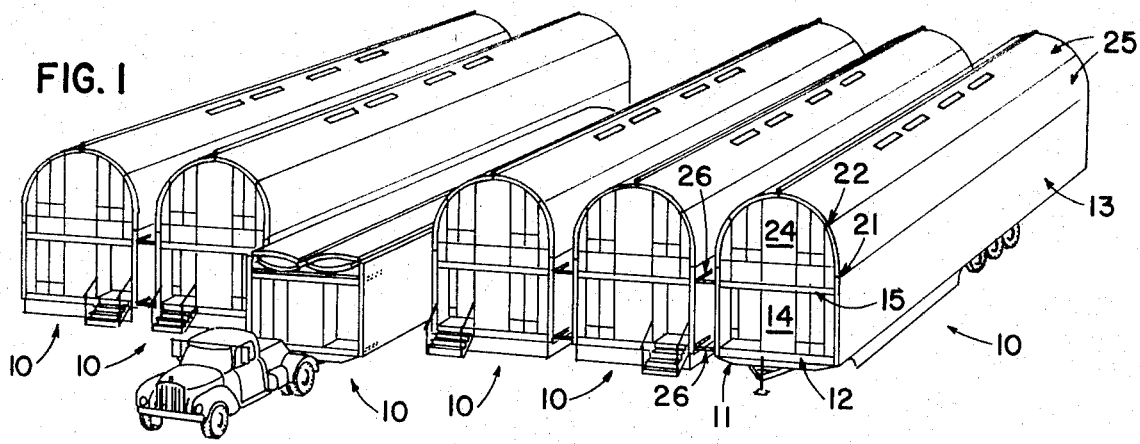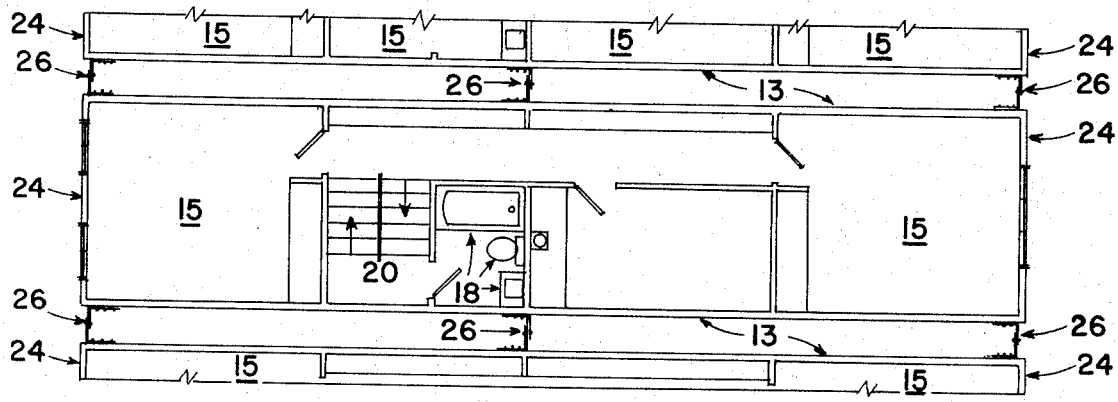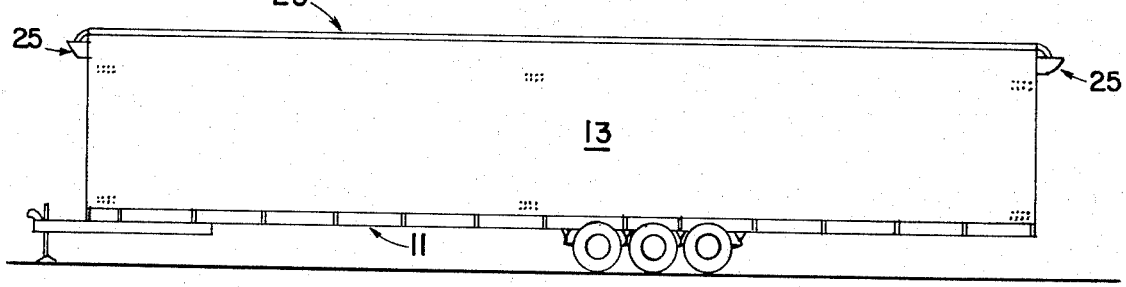

INVENTOR
Richard A. Barlow

PARALLEL ATTACHABLE, TWO STORY EXPANDABLE, TRAILABLE BUILDING STRUCTURES

This invention relates to expandable trailable building structures and the object of this invention is to provide an improved and simplified means by which a series of similar trailable building structures that meet highway transport requirements can be expanded at their location site into two story structures an for stability can be attached together in parallel in such a way as to allow the addition or removal of any one structure without disturbing the others.

One object of this invention is to provide a series of similar trailable building structures that meet highway transit requirements with a series of hingedly mounted sections which when expanded from horizontal positions atop second story floors of the structures, to vertical and diagonal positions form completely enclosed roof and wall areas, adding entirely livable second stories to the structures.

Another object of this invention, and essential to the first is to provide stability to these expanded trailable building structures by means of a series of angularly mounted brackets, which when attached together or to vertically mounted steel posts in the ground between structures, or to parallel masonry walls between structures, joins them in parallel positions that prevent movement such as wind buffeting, but still allows the addition or removal of any one structure when detached.

In the process of expansion and attachment these structures take on the appearance of a clustered townhouse complex, much more esthetically pleasing and more economically and ecologically justifiable.

With the above more important objects in view and such other objects as may become apparent in the following specifications, the invention is shown by arrangement and construction of correspondingly numbered parts set forth in the accompanying drawings and pointed out in the claims which form a part of this specification.

FIG. 1 is a perspective view of the invention, illustrating like structures in the expanded position as they would appear at the location site and attached in parallel with the exception of one structure which has the folding wall and roof members in the folded position and is shown as it would be in either the addition or removal position.

FIG. 2 is a plan view of the invention, illustrating similar structures in the attached parallel position at the first floor level, showing a complete floor plan of one of the structures, including the stair and midfloor level leading up to the second floor, and portions of the adjoining structures.

FIG. 3 is a plan view of the invention, illustrating similar structures in the attached parallel position at the second story level, showing a complete floor plan of one of the structures, including the stair and midfloor level leading down to the first floor, and portions of the adjoining structures.

FIG. 4 is a side view of the invention, illustrating one of the similar structures in the folded position as it would appear in transit.

Figure 5:
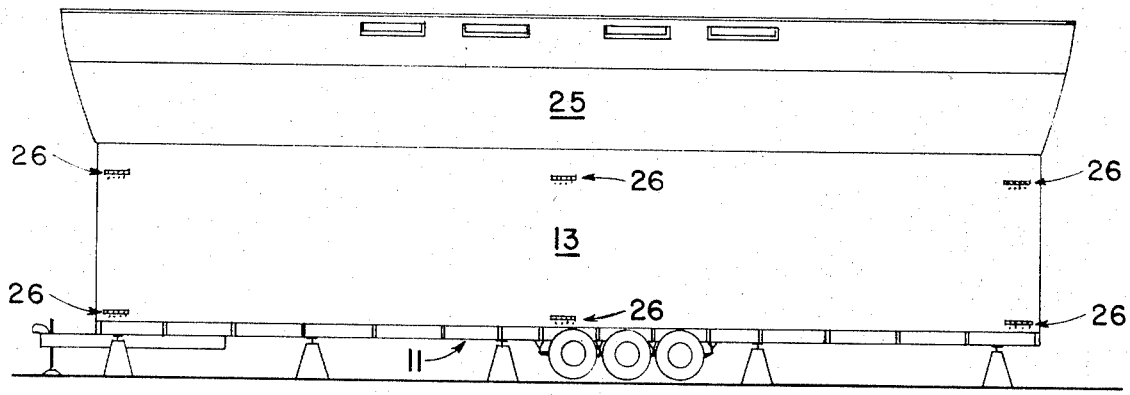
FIG. 5 is a side view of the invention, illustrating one of the similar structures in the expanded position as it would appear at the location site.

Referrlng now to the accompanying drawings, in detail the invention consists of a series of similar expandable trailable building structures designated each by the numeral 10, each of which embodies in its construction a rigid steel I beam frame 11, with necessary axles, wheels, and a hitching unit for connection to a towing vehicle. The I beam frame 11, carries a generally rectangular base structure comprising of a main floor 12, fixed side walls 13, fixed end walls 14, and a second story floor 15, secured to fixed side and end walls.

Referring to FIG. 2, permanent partition walls 16, in the base structure provide a means for installing utilities 17, bathroom fixtures 18, kitchen fixtures 19, and stairs 20.

For the perpose of the invention, connected to the base structure by a series of piano hinges 21, 22, and 23, are two foldable end wall sections 24, two double foldable roof sections 25. Also attachable to the outside portion of fixed side walls at floor levels are a series of angular brackets 26, which when attached to each other join the structures in parallel positions. In the folded and detached position these structures meet all the requirements for highway transit.

In more detail, as seen in FIGS. 6, 7, 8 and 9, it will be noted that in going from the folded position to the expansion phase of any one of the similar structures that piano hinges 21, which secure the folding roof sections 25, to the top portion of fixed side walls 13, allow these sections to be raised from horizontal positions to vertical and diagonal positions to be connected at the apex. It will be further noted that each of the roof sections is further divided by piano hinges 22, which allow one portion of each section to be folded under the other when in the folded position. The perpose being to allow each roof section to fold down in position independently of the other, and also to be lowered enough to meet highway transit requirements. Further detailing shows that piano hinges 23, secure the endwall sections 24, to the top portion of fixed end walls 14, and allow them to be raised from horizontal positions over the fixed second floor 15, to vertical positions after the roof sections 25, have been raised, all to be interconnected in the raised position.

Referring to FIG. 3, partition arrangements can be added to the second story area when in the expanded position to divide it into suitable sleeping and storage areas.

Figure 10:
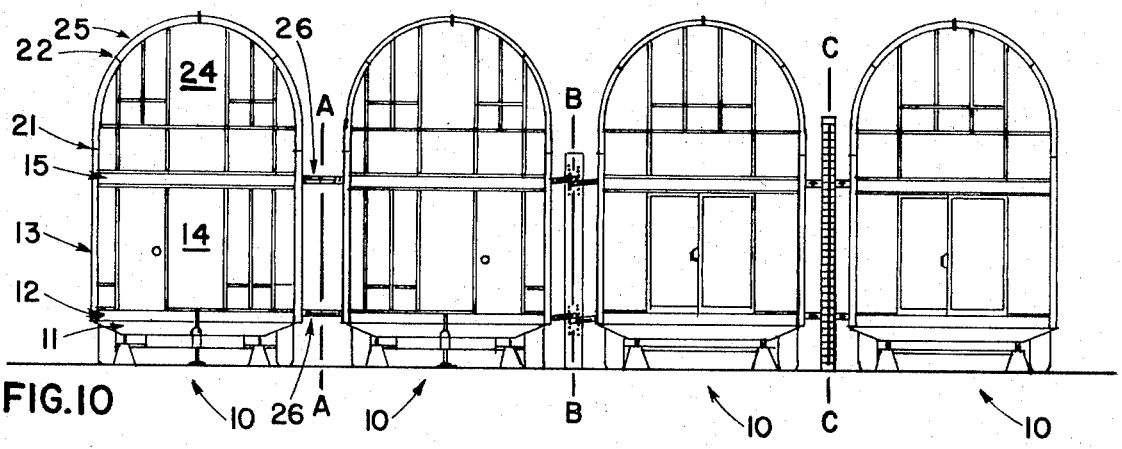
FIG. 10 is an end view of the invention, illustrating a series of the similar structures in the expanded position and attached in parallel as they would appear at the location site.
Figure 11:
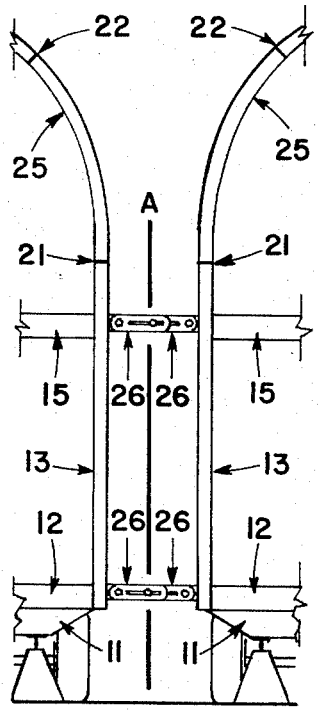
FIG. 11 is a detailed portion of a cross sectional view of the invention, illustrating the arrangement of two of the similar structures at one of the points of attachment at station A—A of FIG. 10.
Figure 12:
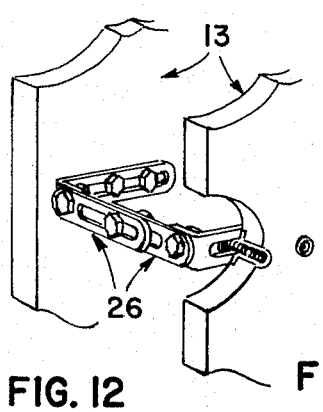
FIG. 12 is a detailed portion of a three dimentional view of the invention, illustrating the arrangement of two of the similar structures at one of the points of attachment at station A—A of of FIGS. 10 and 11.

It will be further noted in FIGS. 10, 11 and 12, that provision is made in the design of the angularly mounted brackets 26, to allow their attachment to the outer portion of fixed sidewalls 13, at varying positions and adjustable vertically and laterally to compensate for changes in the parking positions of individual structures. Also, provision is made in the outwardly protruding portions of the angularly mounted brackets for adjustment diagonally and attachment together at varying lengths.

Figure 13:
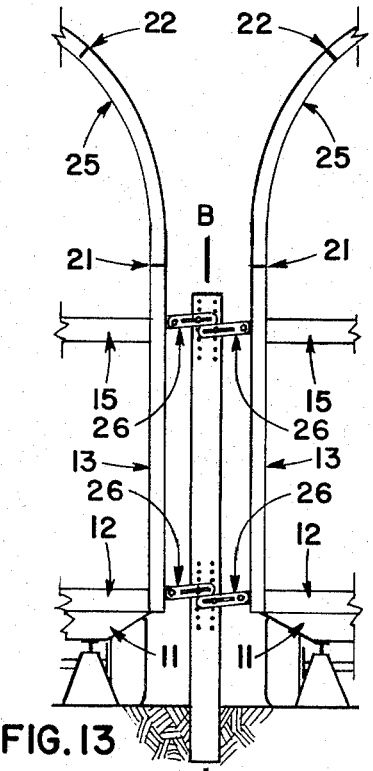
FIG. 13 is a detailed portion of a cross sectional view of the invention, illustrating an alternate arrangement of two of the similar structures at one of the points of attachment at station B—B of FIG. 10.
Figure 14:
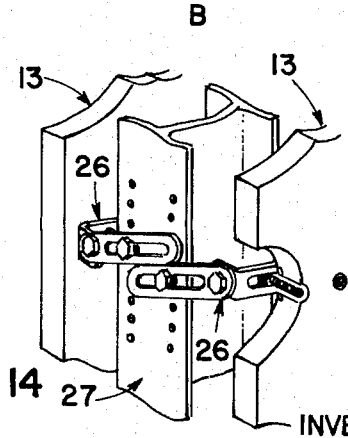
FIG. 14 is a detailed portion of a three dimensional view of the invention, illustrating an alternate arrangement of two of the similar structures at one of the points of attachment at station B—B of FIGS. 10 and 13.

In FIGS. 10, 13 and 14, it will be further noted that an alternate provision is made for attachment of the protruding portion of the angularly mounted brackets 26, at varying lengths to to steel beams 27, vertically mounted in the ground between structures, rather than to each other.

Figure 15:
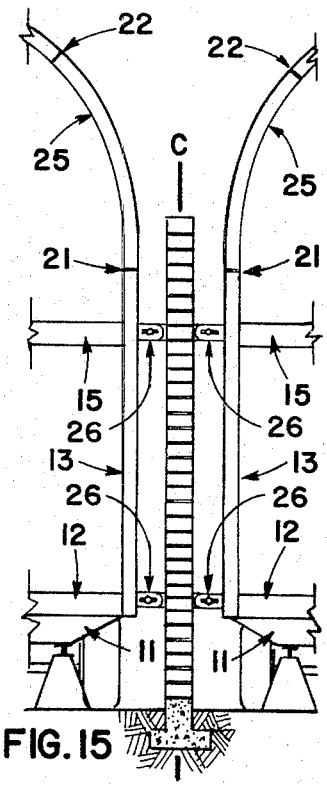
FIG. 15 is a detailed portion of a cross sectional view of the invention, illustrating an altrenate arrangement of two of the similar structures at one of the points of attachment at station C—C of FIG. 10.
Figure 16:
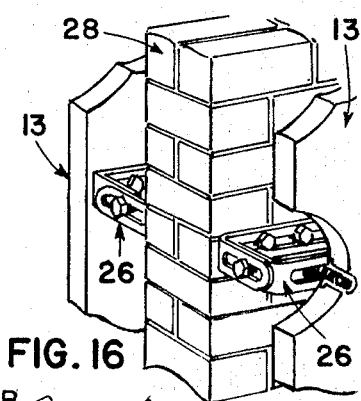
FIG. 16 is a detailed portion of a three dimensional view of the invention, illustrating an alternate arrangement of two of the similar structures at one of the points of attachment at station C—C of FIGS. 10 and 15.

Going one step further, as in FIGS. 10, 15 and 16, it will be noted that alternate provision is made for attaching the protruding portions of angularly mounted brackets 26, to masonry walls 28, positioned parallel between structures, rather than to each other.

The described means of attaching similar structures to each other serves to stabilize them together in parallel positions while still allowing the detachment and removal of individual structures or the attachment of new structures without disturbing the whole.

Figures 6, 7:
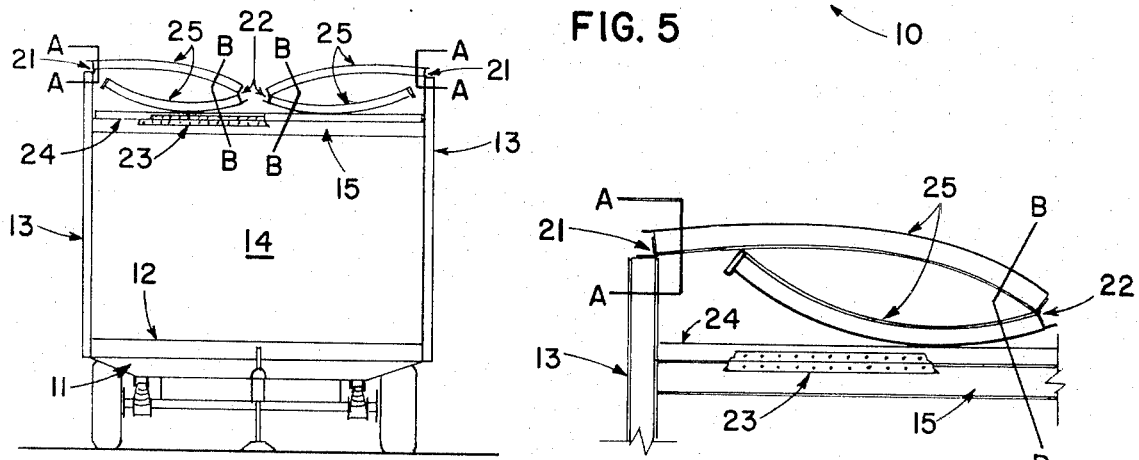
FIG. 6 is a cross sectional end view of the invention, illustrating one of the similar structures in the folded position as it would appear in transit.
FIG. 7 is a detailed portion of a cross sectional end view of the invention, illustrating one of the similar structures in the folded position at stations A—A and B—B of FIG. 6.
Figure 9:
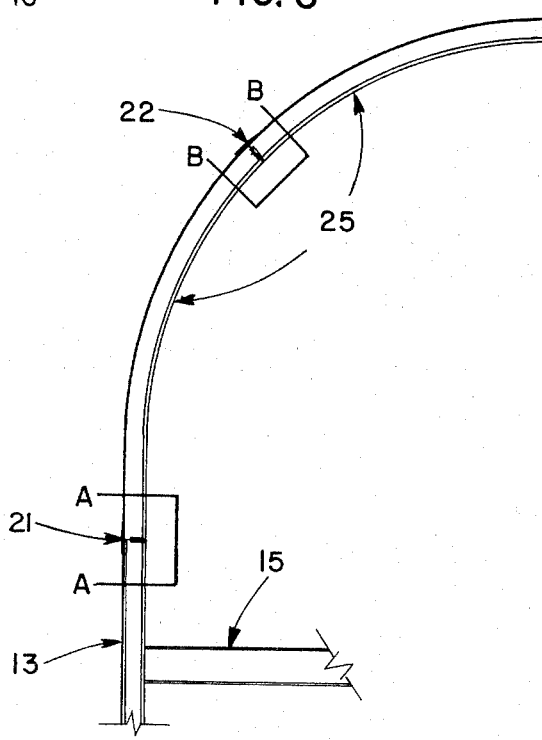
FIG. 9 is a detailed portion of a cross sectional end view of the invention, illustrating one of the similar structures in the expanded position at stations A—A and B—B of FIG. 8.
Figure 8:
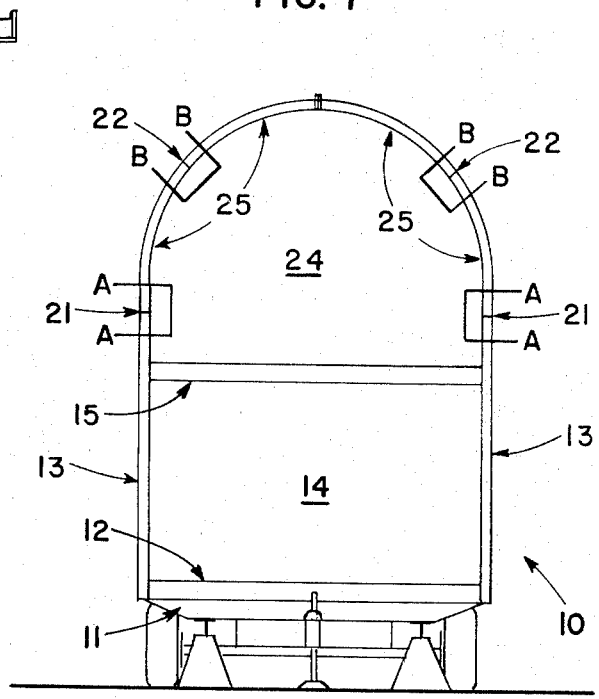
FIG. 8 is a cross sectional end view of the invention, illustrating one of the similar structures in the expanded position as it would appear at the location site.

Further details in FIGS. 6, 8 and 10, show that in any one of the similar structures side walls 13, extend upward beyond the second floor level 15, at equal heights and far enough to allow double folding roof sections 25, to lie in a parallel horizontal position over folding end wall sections 24, when in the folded position.

Figure 17:
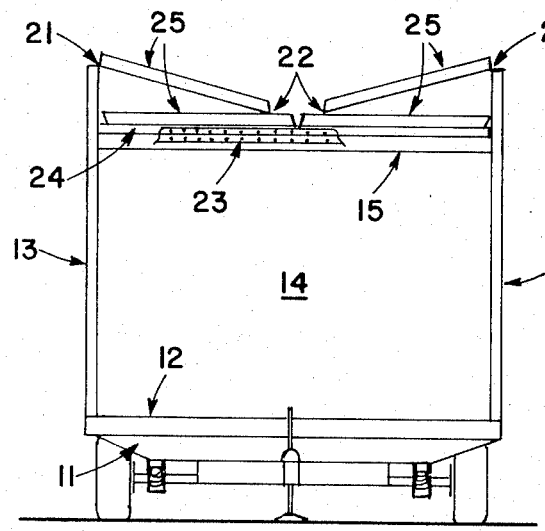
FIG. 17 is a cross sectional end view of the invention, illustrating one of the similar sturctures in the folded position as it would appear in transit, with an alternate roof and end wall configuration.
Figure 18:
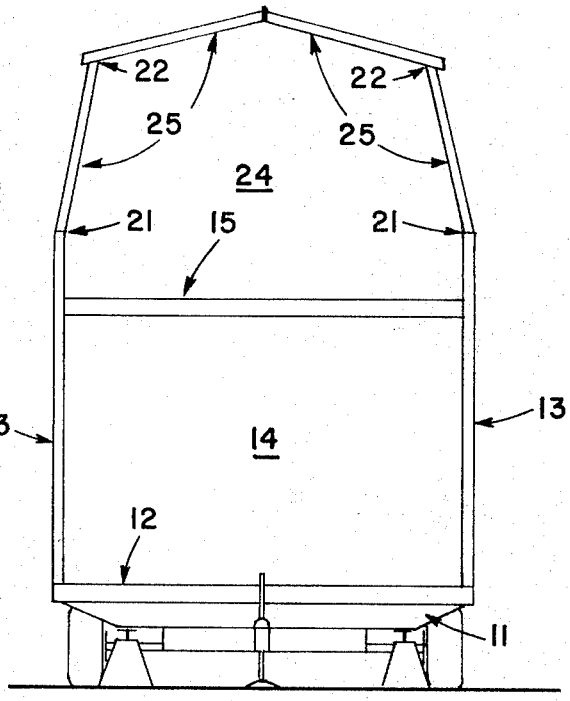
FIG. 18 is cross sectional end view of the invention, illustrating one of the similar structures in the expanded position as it would appear at the location site, with an alternate roof and second story end wall configuration.

Details in FIGS. 17 and 18, show alternate configurations for folding roof sections 25, and folding end wall sections 24, the perpose being to show that the invention can be adapted to different designs in these sections.

From the above description, it is sen that this invention provides for a series of similar trailable building structures which when at the location site can be expanded to form two story structures and for stability can be attached together in a paallel, so called townhouse manner, in such a way that individual structures can be detached and removed or added and attached without disturbing the others.

Any suitable hoisting device such as a crane or a simple winching arrangement can be used to raise the folding sections of the structures to their proper positions.

I claim:

1. A series of parallel interconnected trailers each comprising:
   an expandable building structure with fixed support frame having fixed vertical side walls;
   hinge means attached to the top portion of said side walls;
   at least two foldable roof sections, each having two parts hinged together;
   one end of each of said roof sections being mounted to the hinge means of their respective fixed side walls for pivotally moving about fixed horizontal axes of rotation from separate coplanar horizontal positions with respect to the frame, the two parts of each roof section being juxtaposed one over the other, to upwardly extended angularly oriented positions with respect to the frame, for further pivotal movement of the second parts of said roof sections about their hinged means in simple horizontal axes of rotation from upwardly angled positions with respect to the frame to further upwardly extended angularly oriented positions, the roof sections joining at an apex to form a cover over an expanded area above the frame;
   whereby said trailer fully expanded with its unbalanced height to width ratio is rendered unstable relative to outside forces, and requires an interconnection with similar trailers to gain stability.

2. The structures as defined in claim 1, set in close proximity in parallel positions, together with extendable support means connected to the fixed sidewalls of each structure and correspondingly connected to each other; whereby the connected extended support means provide stability to the structures by joining them together in a manner which allows the addition or removal of any single structure without disturbing the whole.

3. The subject matter as set forth in claim 2, wherein said extendable support means rather than being correspondingly connected to each other are connected individually to ground supported beams set between the structures; whereby the extended support means provide stability to individual structures in a manner which allows the addition or removal of any one structure without disturbing the whole.

4. The subject matter as set forth in claim 2 wherein said extendable support means rather than being correspondingly connected to each other are connected each to ground supported masonry walls set between said structures; whereby the extended support means provide stability to individual structures in a manner allowing their addition or removal without disturbing the whole.

* * * * *